Oct. 21, 1958   C. NORTON   2,856,790
CABLE TENSION REGULATOR
Filed Feb. 23, 1954   3 Sheets-Sheet 1
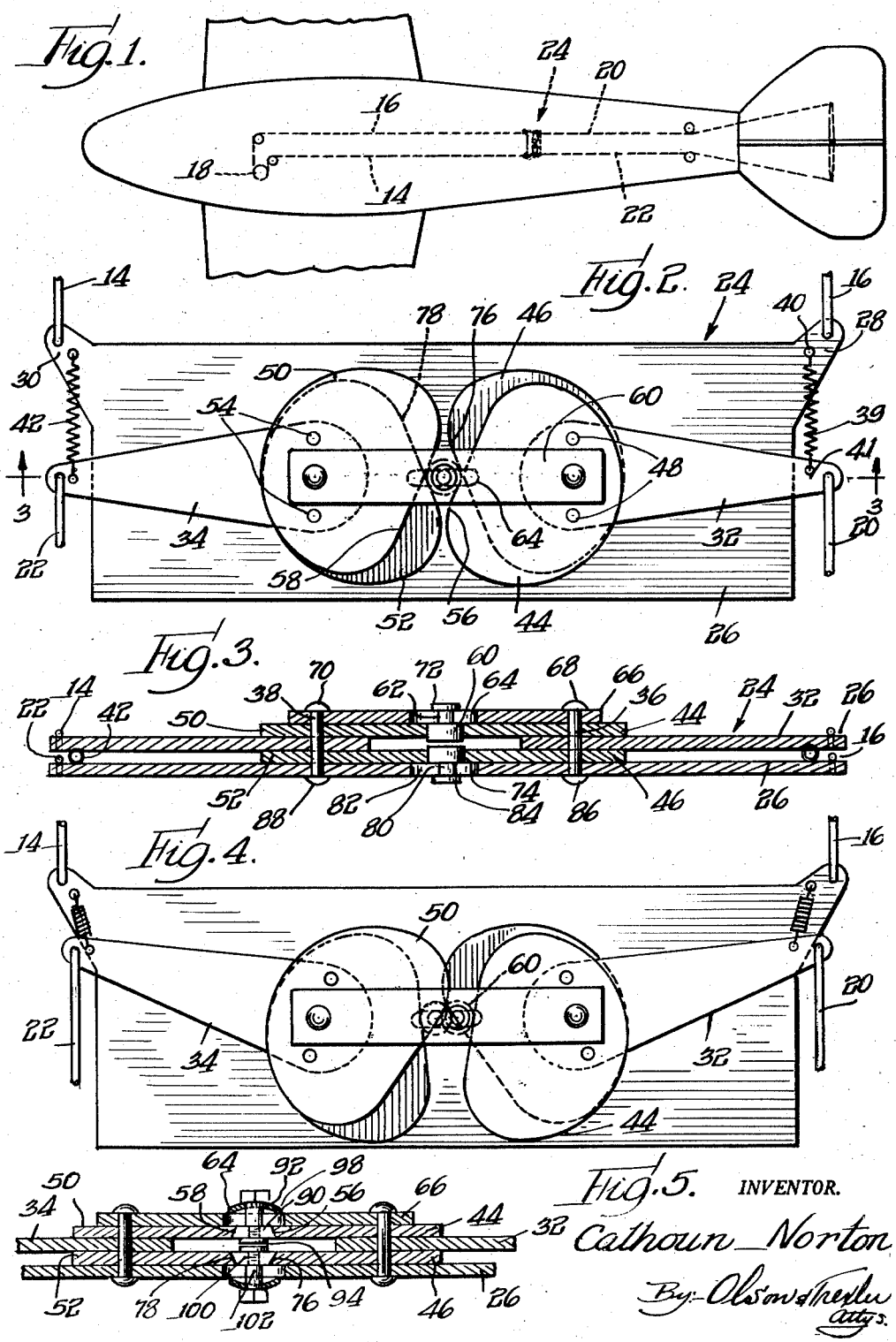

Oct. 21, 1958 C. NORTON 2,856,790
CABLE TENSION REGULATOR
Filed Feb. 23, 1954 3 Sheets-Sheet 2
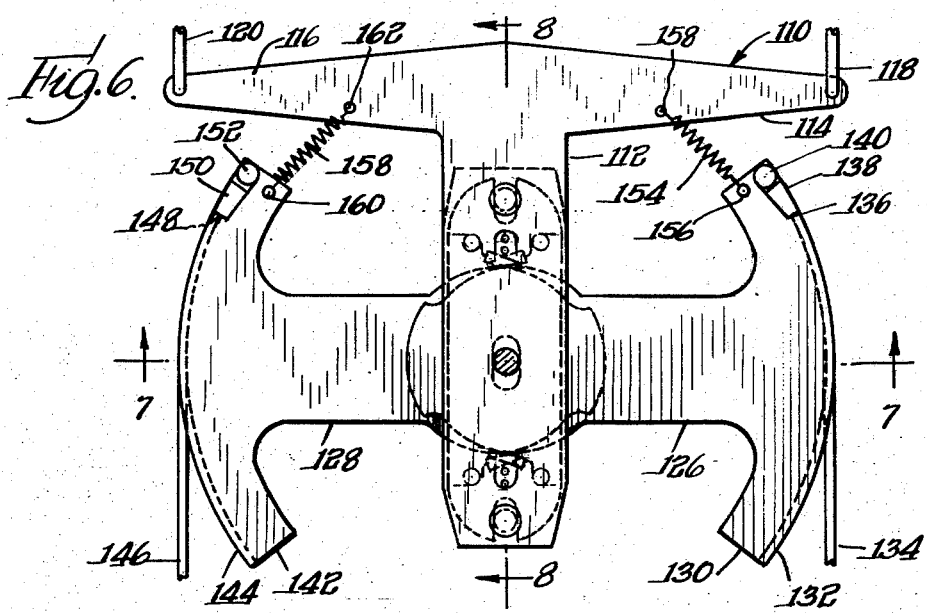
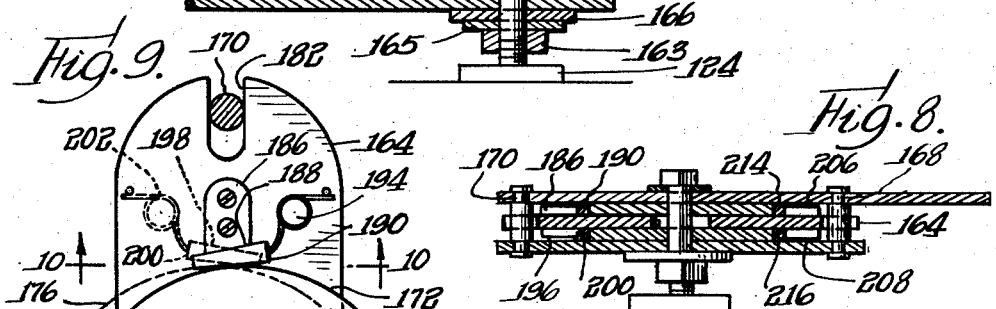
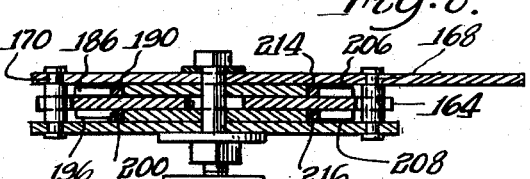
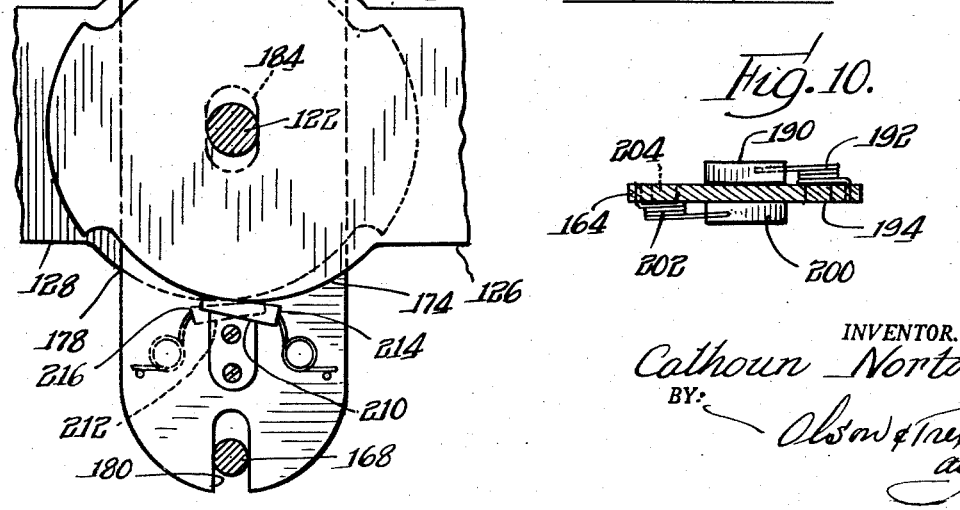
INVENTOR.
Calhoun Norton
BY:

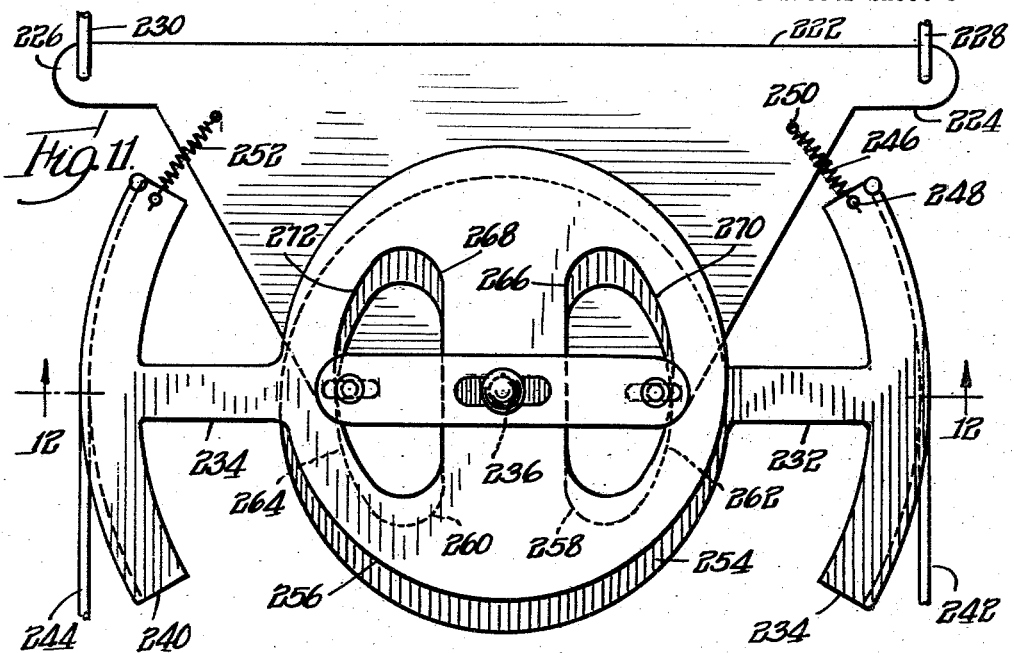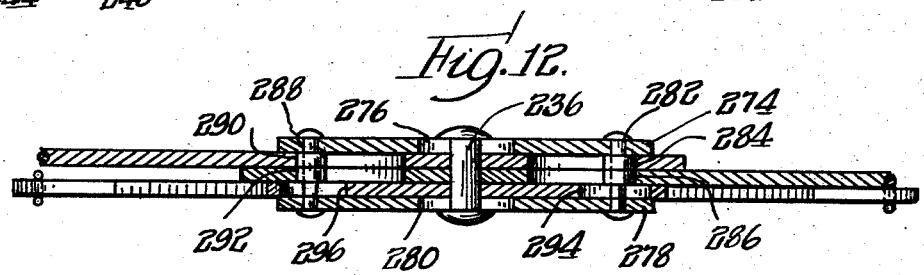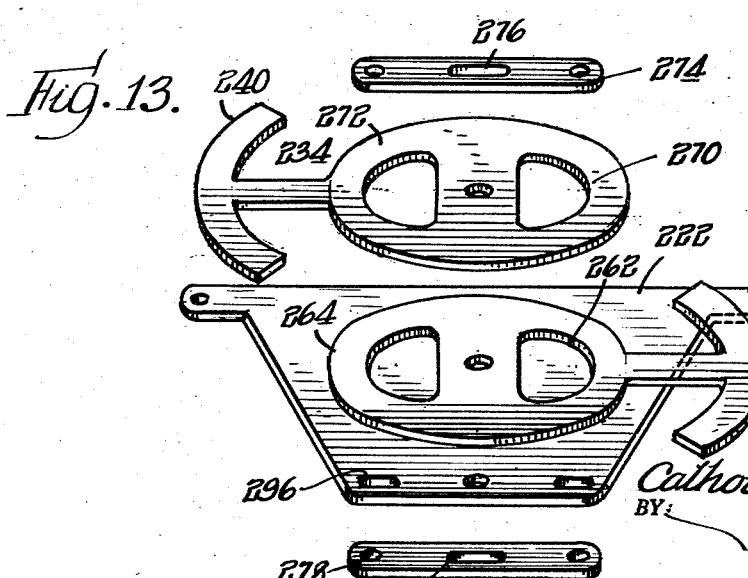

United States Patent Office 2,856,790
Patented Oct. 21, 1958

2,856,790

CABLE TENSION REGULATOR

Calhoun Norton, Glenview, Ill., assignor to Arens Controls, Inc., Evanston, Ill., a corporation of Illinois Application February 23, 1954, Serial No. 411,849

8 Claims. (Cl. 74—501.5)

The present invention relates to novel cable tension regulators, and more particularly to tension regulators especially adapted to control the tension in control cables used for example in airplanes.

In the rather large airplanes now in use, it is necessary to provide long control cables between the pilot's control columns and the various elements to be controlled, such as the ailerons, rudder, and elevator flaps. These cables must be under a certain tension in order to avoid sluggishness of control. It has been found that if the cables are tightened to a desired degree when the airplane is on the ground, where the atmospheric temperature is relatively high, the cables may break under sudden stresses when the airplane reaches an altitude where the cold atmosphere causes a relative contraction between the cables and the body of the airplane so as to increase the tension in the cables. In addition, the relatively long parts of the airplane, such as the fuselage or wings, may flex a considerable amount, thereby increasing or decreasing the tension in the control cables, rendering proper control of the airplane difficult.

It is, therefore, an object of this invention to provide a novel cable tensioning device for maintaining the tension in such control cables substantially constant at all times.

Another object of this invention is to provide a cable tension regulating device having a base plate which may be connected between the ends of complementary control cables at any desired point within the airplane, which plate carries a pair of pivotally mounted arms each of which is connected to continuations of the control cables and which arms are biased by constant tension spring means to maintain the control cables under constant tension.

A more specific object of this invention is to provide a cable tension regulating device of the above described type having novel means for permitting the arms to pivot together to offset variations in the tension of the control cables when the forces applied to the arms by the cables are equal while locking the arms against relative pivotal movement when the forces applied thereto are unequal, such as when the pilot's control column is actuated.

Other objects and advantages of the present invention will be apparent from the following description and the accompanying drawings, wherein:

Fig. 1 is a schematic view, illustrating the application of the novel cable tension regulator of this invention to the control cables of an airplane;

Fig. 2 is a plan view of a cable tension regulator, embodying the principles of this invention;

Fig. 3 is a vertical cross sectional view taken along line 3—3 in Fig. 2;

Fig. 4 is similar to Fig. 2, but shows the pivotally mounted tensioning arms of the device moved to a different position to take up slack in the cables;

Fig. 5 is a fragmentary cross sectional view similar to Fig. 3, but showing a modification of the device in Figs. 2, 3, and 4;

Fig. 6 is a plan view of another form of a cable tensioning regulator, embodying the principles of this invention;

Fig. 7 is a vertical cross section taken along line 7—7 of Fig. 6;

Fig. 8 is a vertical cross section taken along line 8—8 in Fig. 6;

Fig. 9 is an enlarged fragmentary plan view, showing an arm locking mechanism of the device of Figs. 6, 7, and 8 in greater detail;

Fig. 10 is a vertical cross section taken along line 10—10 in Fig. 9;

Fig. 11 is a plan view, illustrating still another form of a cable tension regulator, embodying the principles of this invention;

Fig. 12 is a vertical cross section taken along line 12—12 in Fig. 11; and

Fig. 13 is an exploded perspective view of the device shown in Fig. 11.

Referring now more specifically to the drawings, wherein like parts are designated by the same numerals throughout the various figures, an application of a tension regulator is illustrated in Fig. 1. A pair of control cables 14 and 16, which are adapted to be actuated in unison by a common connection to a pilot's control column 18, are shown to be connected to continuations 20 and 22 of the cables by a tension control device embodying the principles of this invention. The control device may be positioned anywhere that it is convenient along the length of the cables, and, if desired, the device may even be directly connected on one side to the pilot's control column or other flap to be actuated by levers or any other suitable means. The other side of the cable tension control device may then be connected to the ends of the control cables, which cables will be a single length instead of divided in two parts, as illustrated in Fig. 1.

In Figs. 2, 3, and 4, there is illustrated a cable tension regulator 24, which embodies the principles of this invention. The regulator 24 includes a base member 26, which may conveniently be constructed in the form of a substantially elongated rectangular plate, as illustrated. A pair of ears 28 and 30 extend outwardly from the ends of the plate 26 to which ears the ends of the cables 14 and 16 are secured in any suitable manner. A pair of arms 32 and 34 are pivotally mounted on the plate 26 by means of elongated pins 36 and 38, respectively. The arms 32 and 34 are positioned so that they extend from their pivot points in opposite directions generally longitudinally of the base member or plate 26. The outer free ends of the arms 32 and 34 project beyond the opposite ends of the plate member 26 and are adapted to be connected to the continuing portions 20 and 22 of the control cables in any suitable manner. It is readily seen that by moving the outer ends of the arms 32 and 34 towards the ears 28 and 30, respectively, the distance between the ends of the cable portions 16 and 20 and 14 and 22, respectively will decrease, thereby increasing the tension in the cables. Conversely, if the free ends of the arms are moved from the ears, the tension in the cables will be decreased. In order to maintain a constant tension in the cables, it is necessary that the arms 32 and 34 be continuously urged toward the ears by a constant force. In order to provide this constant force, a spring 39 is secured at its opposite ends to the outer end of the arm 32 and to the ear 28. One convenient method for securing the spring to these elements is to provide apertures 40 and 41 in the ear and arm, respectively, through which apertures terminal hook portions of the spring are inserted. This spring 39 is designed to have the character of exerting a substantially constant pull when the spirng is stretched out within certain limits. Thus, the spring 39 constantly biases the arm 32 toward the ear and the ear toward the arm under a substantially constant pull, whereby a substantially constant tension is applied to the cable portions 16 and 20 within the limits of the movement of the arm 32 toward and away from the ear 28. A spring 42 is also connected between the outer end of the arm 34 and the ear 30. The spring 42 is constructed and arranged in a manner identical to that described above for the spring 39, and, therefore, the cable portions 14 and 22 are maintained under a tension which is substantially equal to the tension in the cable portions 16 and 20.

In order to eliminate the constant movement of the arms which would take place due to vibrations within the airplane and unequal stresses set up in the cables when the airplane control flaps, such as the rudder, are subjected to a sudden gust of wind and to enable the pilot to actuate the cables without relative movement between the arms 32 and 34, means is provided to lock the arms against relative pivotal movement when the stresses in the cable portions 16 and 20 are different from the stresses in the cable portions 14 and 22. When, however, the stresses in all of the cable portions are substantially equal, this locking means permits the arms 32 and 34 to pivot toward or away from the ears to maintain the cables under a substantially constant tension.

The above mentioned locking means includes a cam 44 and a cam 46 pivoted about the pin 36 and fixed relative to each other and to the arm 32 by screws 48 or any other suitable means. A pair of somewhat similar cams 50 and 52 are pivoted about the pin 38 and relatively rigidly fixed to each other and to the arm 34 by screws 54. As is shown best in Fig. 3, the cams 44 and 50 are disposed on one side of the arms 32 and 34, respectively, while the cams 46 and 52 are disposed on the opposite sides of the arms. Between the faces 56 and 58 of the cams 44 and 50, respectively, there is mounted a roller 60. The roller 60 is carried by a pin 62 which extends through an elongated slot 64 in a bracket member 66. The bracket member has its ends secured in place by the pivot pins 36 and 38 which are provided with enlarged heads 68 and 70. The pin 62 has a diameter which is only slightly less than the width of the slot 64 in the bracket 66, whereby the pin is free to move only in a straight line path. It should be noted that the center line of the slot 64 passes through the axes of the pivot pins 36 and 38, whereby the pin 62 carrying the roller 60 moves in a straight line which also passes through the pivot pins 36 and 38. The pin 62 and the roller 60 are supported on the bracket member 66 by means of an enlarged head 72 which has a diameter greater than the width of the slot 64. A second roller 74 is disposed between the faces 76 and 78 of the cams 46 and 52. The roller 74 is carried by pin 80 which extends through a slot 82 in the base member or plate 26. The slot 82 is formed and located in a manner identical to that of the above described slot 64. The pin 80 is provided at its outer end with an enlarged head 84 to retain it in assembled relationship within the slot. The base member 26 is restrained against pivotal movement relative to the pivot pins 36 and 38 by extensions of these pins projecting through apertures in the base plate and enlarged heads 86 and 88 which retain the base member in assembled relationship with the arms and the cams.

The operation of the tension regulator 24 is as follows. It is assumed that with the parts in the positions shown in Fig. 2, the cable portions 14, 16, 20, and 22 are under the desired tension. Then, if for any reason the cable portions tend to become slack, the constant tension spring 39 will pull the arm 32 in a counterclockwise direction, and the spring 42 will pull the arm 34 in a clockwise direction, as viewed in Figs. 2 and 4, until the arms reach positions where the slack is taken up and the desired tension is applied to the cable portions. Such a movement of the arms is illustrated in Fig. 4.

This movement also causes the cams 44, 46, 50, and 52 to move to the positions shown in Fig. 4.

It should be noted that the cam surface 56 on the cam 44 recedes in a clockwise direction, or in other words, the radii of the cam 44 along the surface 56 decrease in a clockwise direction. Furthermore, the cam surface 58 on the cam 50 recedes in a counterclockwise direction. Thus when the cam 44 is rotated in a counterclockwise direction and the cam 50 is rotated in a clockwise direction, as shown in Fig. 4, the roller 60 is moved toward the right by the advancing salient portion of the cam surface 58 which movement is permitted by the advancing receding portion of the cam surface 56.

The cam surface 76 on the cam 46 is formed similar to, but the reverse of, the cam surface 56 on the cam 44, or in other words, the cam surface 76 recedes in a counterclockwise direction. The cam surface 78 on the cam 52 also recedes in a counterclockwise direction so that upon rotation of the arms 32 and 34, as illustrated in Fig. 4, the roller 74 is moved to the left by the cam surface 76, which movement is permitted by the receding cam surface 78. Thus, it is seen that upon movement of the arms 32 and 34 to the position shown in Fig. 4, the roller 60 is moved to the right while the roller 74 is moved to the left.

However, it should be noted that the cam mechanism described above locks the arms 32 and 34 against rotation about their respective pivots, unless the forces tending to move the arms are substantially equal. This is because of the ball clutch effect provided by the roller 60 between the cam surfaces 56 and 58 and the roller 74 between the cam surfaces 76 and 78. This results from the fact that the cam surfaces 56 and 58 are formed so that the distance between them is such that both surfaces are always in engagement with opposite sides of the roller 60 and apply forces to the roller in directions extending substantially normally from the cam surfaces at the points of contact with the roller 60. Furthermore, the slope of the cam surfaces 56 and 58 is such that the generally opposite forces exerted on the roller tend to hold the roller 60 stationary so that the cams 44 and 50 which frictionally engage the roller 60 are normally locked against movement relative to each other to lock the arms 32 and 34 against relative movement.

The cams 46 and 52 are constructed similarly to the cams 44 and 50 so that the lower roller 74 normally locks the cams 46 and 52 against movement relative to each other. The locking action of the roller 74 on the cams 46 and 52 also helps to lock the arms 32 and 34 against movement relative to each other.

The locking action of the rollers 60 and 74 with their respective cooperating cams can only be overcome by substantially equal torques applied to the ends of the arms 32 and 34. For example, if the cable portions tend to become slack for any reason, the constant tension springs bias the arms toward their retracted positions shown in Fig. 4 with substantially equal forces. Starting with arm 34, this rotation of the arm 34 causes the cam 50 to force the roller 60 towards the right, as described, and permits the roller 74 to be moved towards the left. If there was no force tending to turn the arm 32 and thus the cam 44, it is readily seen that the roller 60 would be forced against the cam surface 56 with increased pressure, which increased pressure would more securely lock the roller 60 against rotation and also prevent the arm 34 from rotating. But assuming that the arm 32 is being biased to its retracted position by a force substantially equal to the force applied to the arm 34, it is seen that the cam 44 is turned to prevent this buildup or increase of locking pressure on the roller 60. The same action takes place between the lower cams 46 and 78 and the roller 74. It is, of course, understood that the torque applied to the arms 32 and 34 must be sufficient to overcome the normal locking action of the rollers when the forces in cable systems are in balance.

In addition, assuming that the forces applied to the arms tending to rotate them relative to each other are unequal or are directed in opposite directions, such as when the pilot actuates the control column, it is clear that the cam and roller mechanism will prevent relative rotation between the arms 32 and 34. If, for example, cable 22 becomes slack so that spring 42 tends to pull the arm 34 toward its retracted position while the cable portion 20 becomes taut and tends to pull the arm 32 toward its extended position illustrated in Fig. 2, the cams and rollers will lock the arms 32 and 34. This is because the arm 34 cannot move in a clockwise direction until the roller 60 moves to the right, which roller cannot move toward the right unless the arm 32 moves in a counterclockwise direction. Furthermore, the roller 74 would be unable to move towards the left.

Assuming that the portions of the cable control system become, for any reason, unequally taut so that there is a greater force tending to urge the arm 32 from its retracted position to an extended position, such as that shown in Fig. 2, than a force tending to bias the arm 34 toward an extended position, the locking cams and rollers will effectively resist such movement. In this example, when the arm 32 starts to move outwardly in a clockwise direction, the cam 44 will force the roller 60 against the cam 50 with increased pressure. The cam 60 cannot, however, move until the arm 34 and its interconnected cam 50 move in a counterclockwise direction. Due to the increased pressure on the roller 60, its locking effect is also increased, which requires that an increased torque be applied to the arm 34 before the increased locking effect of the roller 60 can be overcome. Therefore, under the forces applied to the arms in this example, the cam and roller mechanism will lock the arms against rotation relative to each other.

From the above examples, it is seen that the cam and roller locking mechanism of the tensioning device 24 effectively locks the arms 32 and 34 at all times, unless there are substantially equal forces tending to move or rotate one of the arms in a clockwise direction and the other of the arms in a counterclockwise direction. Since in general the conditions which change the tension in one side of the cable control system including cable portions 16 and 20 to produce a substantially equal change in the tension in cable portion 14 and 22, the tension regulator 24 readily functions to adjust these changing tensions. Furthermore, it is seen that if the tension in the two sides of the cable system becomes unequal, as when the system is actuated by the pilot, the arms 32 and 34 are locked relative to each other and to the base plate or member 26 to provide a rigid unit which assures quick control response to the desires of the pilot.

Fig. 5 illustrates a slightly modified form of the regulator unit 24 shown in Figs. 1 through 4. In this embodiment, the cam surfaces 56 and 58 are beveled so that they taper toward each other from the inner side of the cams toward their outer sides, as illustrated. The roller 60 has been replaced by a bevelled or tapered roller 90 which is adapted to cooperate with the bevelled cam surfaces. The roller 90 is rotatably mounted on a pin 92 and is retained thereon by an enlarged head 94. The pin 92 extends outwardly through the slot 64 in the bar 66 and is provided at its outer end with an enlarged head 96 which may be in the form of a nut threaded on the end of the pin. A resilient spring washer 98 is positioned on the pin 92 between the head or nut 96 and the bar 66. The washer 98 has an outside diameter greater than the width of the slot 64 so that the washer continuously presses against the under surface of the head or nut 96 to urge the pin 92 outwardly, which pin in turn forces the tapered or inclined surfaces of the roller 90 against the beveled surfaces of the cams 44 and 50.

The cam surfaces 76 and 78 of the cams 46 and 52 in the embodiment of Fig. 5 are also tapered or beveled. A beveled roller 100 is substituted for the previously described roller 74. The beveled roller 100 is rotatably mounted on a pin 102 which is identical to the above described pin 92. The beveled roller is also continuously urged against the beveled cam surfaces by means of a resilient spring washer 104.

The advantage of the structure shown in Fig. 5 over that shown in Figs. 2, 3, and 4 is that the spring washers continuously urge the rollers toward the cams and thus insure continuous contact of the rollers with the cams. This is important to prevent looseness or play in the locking action of the cams and rollers. It has been found that in actual practice it is very difficult to accurately machine the cams and rollers in the form shown in Figs. 2, 3, and 4 so that each roller is constantly in contact with both of its cooperating cams. The difficulty has been overcome by the structure of Fig. 5, wherein the rollers are at all times resiliently urged against the beveled cam surfaces.

In Figs. 6 through 10, there is illustrated a cable tension regulator 110 which embodies in another form the principles of the invention. The regulator 110 includes a substantially T-shaped member having a shank 112 and a head comprising arms 114 and 116. A cable portion 118 may be secured in any suitable manner to the outer end of the arm 114, and a second cable portion 120 may be secured to the outer end of the arm 116.

The T-shaped member may be pivotally supported by a pin 122 extending through an aperture in the shank 112, which pin may have one end threaded into or otherwise secured to a fixed base member 124. With the regulator 110 pivotally mounted to a fixed base by pin 122, the device is particularly adapted for use with the cable portions 118 and 120 which are short, or when the arms 114 and 116 are connected by levers, not shown, to a pilot's control column or to a control flap, such as a rudder. However, if desired, the connection of the pivot pin 122 with a fixed base can be eliminated and the regulator can be freely suspended between the cable portions of the cable control system in the manner described above for the regulator device 24 shown in Figs. 2 through 4.

A pair of arms 126 and 128 are also pivotally mounted on the pivot pin 122. These arms are preferably disposed below the T-shaped member, as shown best in Figs. 7 and 8. The arm 126 is provided at its outer end with a curved head 130 having an arcuate outer edge 132. The outer edge 132 is formed with a groove adapted to receive and guide a cable portion 134 around the periphery of the head. The head 130 is recessed, as at 136, to provide space for a cable fastening tip 138 which is secured to the end of the cable portion 134. The tip 138 may be any of various standard types having a tubular section fastened to the cable in any suitable manner and having a flattened free end provided with an aperture to receive a fastening screw 140. The screw 140 securely holds the flattened end of the tip 138 to one side of the head 130, as shown in Fig. 6. The tip is then bent so that its tubular end which is secured to the cable aligns with the grooved edge 132 of the head. Since the edge 132 is the arc of a circle having as its center the pivot pin 122, it is seen that the cable portion is always spaced a constant distance from the pin 122 during the movement of the arm 126, as described below.

The arm 128 is provided with a curved head 142 which is substantially identical to the head 130 of the arm 126. Thus, the head 142 is provided with a grooved edge 144 adapted to receive a cable portion 146 and a recess 148 adapted to receive the tubular end of a cable fastening tip 150. The tip 150 is secured to the head 142 by a screw or rivet 152 in the same manner as the tip 138 is secured to the head 130.

A constant tension spring 154 is provided to bias constantly the arm 126 in a counterclockwise direction toward a retracted postion, as viewed in Fig. 6. The spring 154 is mounted between the arm 126 and the arm 114 of the T-shaped member in any suitable manner, as by passing one hooked end of the spring through an aperture 156 in the arm 126 and the other hooked end of the spring through an aperture 158 in the arm 114. It should be noted that the apertures 156 and 158 lie in an arc having the pivot pin 122 as its center so that the direction of pull of the spring on the arm 126 is always closely the same within the rather limited pivotal movement contemplated for the arm 126.

Another constant tension spring 158, which is substantially identical to the spring 154, is connected between the head 142 of the arm 128 and the arm 116 of the T-shaped member. The spring 158 may be mounted by passing one end through an aperture 160 in the head and another end through an aperture 162 in the arm 116. The apertures 160 and 162 are also preferably disposed on an arc having the pivot pin 122 as its center.

As shown best in Figs. 7, 8, and 9, a slide bar 164 is disposed between the arms 126 and 128. The elements of the regulator 110 are held together by a frame member 166 which is also pivotally mounted on the pin 122. The frame member 166, which preferably has substantially the same shape as the elongated shank 112 of the T-shaped member, is secured to the shank by rivets 168 and 170. These rivets are provided with reduced diameters adjacent their outer ends so that the junctions of the reduced diameter portions with the mid portions provide shoulders for spacing the shank 112 and the frame member 166. This spacing is such that the elements are held closely together while at the same time permitting the arms 126 and 128 and the slide bar 164 to move relative to each other and to the shank and frame member. If desired, the rivets may be formed with a constant diameter and spacing sleeves may be assembled on the rivets between the shank and frame member. The outer ends of the rivets are enlarged or peened over in the usual manner to hold the rivets in place. The regulator unit 110 is preferably supported on the pin 122 above the fixed base by a threaded nut 163 and a washer 165, as shown in Figs. 7 and 8. The unit is retained on the pin by a nut 167 and washer 169.

Referring now more particularly to Fig. 9, it is seen that the inner ends of the arms 126 and 128 are enlarged and provided with cam surfaces. Thus, one edge of the enlargement on arm 126 is provided with a cam surface 172, and the other edge is shaped to form a cam surface 174. It should be noted that the cam surface 172 recedes in a counterclockwise direction, while the cam surface 174 recedes in a clockwise direction. One edge of the enlargement of arm 128 is formed with a cam surface 176, and the other edge is formed with a cam surface 178. Is should be noted that the cam surface 176, which is adjacent the cam surface 172, recedes in a clockwise direction, while the cam surface 178 recedes in a counterclockwise direction.

The slide bar 164 is provided with end slots 180 and 182 which accommodate the larger diameters of the rivets 168 and 170, respectively. The widths of these slots is such that they closely fit the rivets so that the slide bar is restrained against pivotal movement relative to the T-shaped member. A third slot 184 is provided in the slide bar 164 to accommodate the pivot pin 122. The pin 122 and the rivets 168 and 170 are arranged so that they have a common center line so that this slide bar may be moved back and forth in a straight line.

A stop member 186 is secured to the slide bar and located so that its center line is common with the common center line of the rivets 168 and 170, the pivot pin 122, and the cam surfaces. The stop member 186 is provided with an abutment surface 188 which is inclined at an angle to this common center line and which is spaced radially from the cam surface 172. A wedge 190 is inserted between the cam surface 172 and the abutment surface 188 and is resiliently urged between these surfaces by a coil spring 192 mounted on a pin 194 threadedly or otherwise secured to the slide bar 164. As shown best in Fig. 10, one end of the spring 192 is secured within an aperture in the wedge, and the other end of the spring is anchored within an aperture in the slide bar.

On the opposite side of the slide bar from the stop member 186, there is secured a second stop member 196 which is disposed in substantially the same manner as the stop member 186. However, since the direction of recession of the cam surface 176 is the reverse of the direction of recession of the cam surface 172, the abutment surface 198 is inclined to the common center line at an angle which is the reverse of the angle of inclination of the abutment surface 188. A second wedge 200 is resiliently urged between the abutment surface 198 and the cam surface 176 by a coil spring 202 mounted on a pin 204 and having its ends secured in substantially the same manner as the spring 192.

At the opposite end of the slide bar, there is mounted another pair of stop members 206 and 208 which are disposed in substantially the same manner as the stop members 186 and 196. It should be noted that the abutment surface 210 of the upper stop member 206 is inclined to the common center line at the same angle as the abutment surface 198 of the stop member 196 since the cam surface 174 recedes in the same direction as the cam surface 176. Similarly, the abutment surface 212 of the lower stop member 208 is inclined to the common center line at the same angle as the abutment surface 188 of the stop member 186. A pair of wedges 214 and 216 are resiliently urged between the abutment surface 210 and the cam surface 174 and the abutment surface 212 and the cam surface 178, respectively. The springs for biasing the wedges 214 and 216 are identical to the springs 192 and 202.

The operation of the cable tension regulator 110 is similar to the operation of the regulator 24 described above, and it will be seen that the cam mechanism will lock the arms 126 and 128 at all times, unless there are equal forces tending to effect a contra-rotation of the arms and their respective cams. If, for example, forces were applied which tend to rotate both arms in a clockwise direction, it may readily be seen that such movement would be impossible since the cam 172 would tend to force the stop member 186 and slide bar in one direction while the cam 178 would tend to force the stop member 208 and the slide bar in the opposite direction.

The cams, wedges, and stop members are constructed so that they will lock the arms 126 and 128 when unequal forces are applied which tend to impart contra-rotation to the arm. In order to perform this function, it is desirable that the point of contact of each of the tapered wedges with their respective cam surfaces be located on the common center line of the slots in the slide bar. Furthermore, the cam surface contacting side of each of the wedges should be tangent to the cams at these points of contact and should be inclined from a radius of the cams at the point of contact at an angle of about 4° or less. At this angle, the inclined surfaces of the wedge and the cam tend to bind when forced together and resist relative sliding movement. One specific example illustrating a structure as shown in Figs. 6 through 10 which has the above characteristic is as follows. Assuming that the maximum radius of each cam surface is 1.5 inches and that each cam surface recedes at the rate of .002 of an inch per degree of rotation, a line drawn tangent to the cam surfaces at the common center line of the slots of the slide bar will be inclined at an angle of 4° to the center line. The tapered wedges are constructed so that the angle included by their converging faces or sides is about 5°. Therefore, in order to present the cam contacting sides of the tapered wedges at an angle of 4° to the cam surfaces, the abutment surfaces on the stop members are inclined to the common centerline at angles of about 9°.

Since the cam surfaces are not arcs of true circles, it is seen that the actual points of tangency of the wedges with the cam varies a slight amount from the common center line of the slots in the slide bar as the cams are rotated. This fact tends to create some play or looseness in the cam locking mechanism, but it has been found that by resiliently urging the wedges between the cam and abutment surfaces, any looseness is eliminated, and the mechanism locks or releases the arms in a satisfactory manner at all stages of its travel.

If for some purposes it is found that a slight amount of looseness in the cam locking mechanism is not objectionable, it is obvious that the wedges could be eliminated and the stop members could be positioned so that there abutment surfaces bear directly against the cam surfaces. In this case, the abutment surfaces would be formed so that they extend at angles of about 4° to the common center line.

Referring now to Figs. 11, 12, and 13, wherein there is shown a cable tension regulator 220 which embodies still another form of this invention, the regulator 220 includes a frame member or plate 222 having ears 224 and 226 extending from opposite sides thereof. Cable portions 228 and 230 are secured to the ears in any suitable manner.

A pair of arms 232 and 234 are pivotally mounted on the plate member by a pin 236. The arms are provided at their outer free ends with curved heads 238 and 240, which heads are substantially identical to the curved heads 130 and 142 described above for the regulator 110. Cable portions 242 and 244 are received in the grooved edges of the heads 238 and 240 and secured to the heads by any suitable means. A constant tension spring 246, having one end secured in an aperture 248 in the head 238 and the other end hooked about a pin 250 on the plate member 222, is provided for continuously biasing the arm 232 in a counterclockwise direction toward a retracted position. A second constant tension spring 252 is secured in a similar manner between the head 240 and the plate member 222.

The inner ends of the arms are enlarged into generally circular discs 254 and 256. The disc 254 is provided with a pair of elongated openings 258 and 260 on opposite sides of the pivot pin 236. The outer edges 262 and 264 of the openings 258 and 260, respectively are machined to provide inwardly facing internal cam surfaces. The cam surface 262 is formed so that it recedes in a counterclockwise direction, or, in other words, the length of the radii of the cam surface 262 decreases in a counterclockwise direction as viewed in Fig. 11. The cam surface 264 is formed just the opposite so that it recedes in a clockwise direction.

The enlarged disc of the arm 234 is also provided with a pair of elongated openings 266 and 268. The outer edge 270 of the opening 266 is machined to provide a cam surface which recedes in a clockwise direction while the outer edge 272 of the opening 268 is formed to provide a cam surface which recedes in a counterclockwise direction.

The cam locking device of this embodiment comprises a slide bar 274 slidably disposed on the outer surface of the upper arm 234. The bar 274 is provided with an elongated slot 276 through which the pivot pin 236 extends. A similar slide bar 278 is disposed along the outer or under surface of the frame plate 222. The bar 278 is also provided with an elongated slot 280 through which the lower end of the pivot pin 236 extends. The ends of the pin 236 are provided with enlarged heads having diameters greater than the width of the slots 276 and 280 to retain the parts in assembled relationship.

A pin 282 is mounted between the slide bars 274 and 278 adjacent the cam surfaces 262 and 270. A pair of rollers 284 and 286 are rotatably disposed on the pin 282 between the slide bars for engagement with the cam surfaces. A like pin 288 is mounted between the slide bars adjacent their opposite ends and carries a second pair of rollers 290 and 292 which are adapted to engage the cam surfaces 272 and 264, respectively. The pins 282 and 288 are spaced so that the rollers are always in engagement with their cooperating cam surfaces. The plate member 222 is provided with elongated slots 294 and 296 through which the pins 282 and 288 extend. These slots have a width which is substantially equal to the diameter of the pins so that the pins and slide bars are restrained against rotational movement relative to the plate member 222 while being movable back and forth across the plate member in a straight line. It should be noted that the guide slots 294 and 296 and the pivot pin have a common center line and that the cam surfaces are formed so that their points of contact with the rollers are disposed on said common center line.

The operation of the regulator 220 is substantially identical to the operator of the regulator 110 described above. Thus, for example, if forces tend to rotate both of the arms 232 and 234 in a clockwise direction, the cam surface 262 tends to force the roller 286 and the slide bars toward the left. This movement is, however, resisted by the cam surface 272 tending to force the roller 290 and the slide bars to the right. If unequal forces are applied to the arms which, for example, tend to rotate arm 232 in a counterclockwise direction and the arm 234 in a clockwise direction, the cam and roller mechanism locks the arms. Assuming the greater force is applied to arm 232, it is seen that the cam surface 264 acting against the roller 292 forces the slide bars towards the right, thus forcing the roller 284 against the cam surface 270. The ball clutch type action which takes place between the roller 284 and the cam surface 270 locks the arm 234 against pivotal movement until the force or torque applied to the end of the arm is sufficient to overcome the binding action of the roller. This force, as explained more fully above, must be substantially equal to the force tending to rotate the arm 232.

From the above description, it is seen that the present invention provides a cable tension regulator which is capable of accomplishing the objects set forth hereinabove. Furthermore, the regulators of this invention are lightweight, relatively simple to manufacture, and may easily be installed at any desired location within the control cable system.

While certain preferred embodiments of this invention have been shown and described herein, it is obvious that many modifications may be made in the structural details thereof without departing from the spirit and scope of the appended claims.

I claim:

1. A cable tension regulator, comprising a pair of arms, means for pivotally mounting said arms, each of said arms being adapted to be interconnected adjacent one end thereof with a tensioned cable portion of a cable system, means for resiliently biasing said arms from extended positions to retracted positions to maintain said cable portions under a predetermined tension, separate cam means interconnected with and movable with each of said arms, each of said cam means having a first cam surface which recedes in a clockwise direction toward the pivotal axis of its associated arm and a second cam surface which recedes in a counterclockwise direction toward the pivotal axis of its associated arm, cam locking means disposed for substantially continuous engagement with a first cam surface of one of said cam means and a second cam surface of the other of said cam means, and means mounting said cam locking means for substantially straight line motion transversely of said cam surfaces.

2. A cable tension regulator, as defined in claim 1, which includes spring means for resiliently biasing said cam locking means against said cam surfaces.

3. A cable tension regulator, as defined in claim 1, wherein each of said cam locking means includes roller means engageable with said cam surfaces.

4. A cable tension regulator, as defined in claim 1, wherein each of said cam locking means includes roller means for engagement with said cam surfaces, the roller means on one of said cam locking means being rotatable independently of the roller means of the other of said cam locking means.

5. A cable tension regulator as defined in claim 1, wherein each of said cam locking means comprises a plurality of blocks disposed for engagement with said cam surfaces.

6. A cable tension regulator, as defined in claim 1, wherein cam surface engaging sides of said blocks are disposed at angles of less than about 4° to radii of said cam means at the points of contact of the blocks with the cam surfaces.

7. A cable tension regulator, as defined in claim 1, which includes each of said cam locking means having beveled cam surface engaging elements, said cam surfaces being beveled to cooperate with said cam surface engaging elements, and means for resiliently urging said cam surface engaging elements into engagement with said beveled surfaces.

8. A cable tension control, comprising a frame member having opposite end portions adapted to be interconnected with a pair of portions of a cable control system, a pair of arms pivotally connected with said frame member, said arms being adapted to be interconnected with tensioned cable portions of a cable control system at points spaced from their respective pivotal connection with said frame member, spring means for biasing said arms from an extended position towards a retracted position to apply tension to the cable portions, separate cam means rigidly interconnected with each of said arms and movable with said arms about their respective pivotal connections with said frame member, each of said cam means having a first cam surface which recedes in a clockwise direction toward the pivotal axis of its associated arm and a second cam surface which recedes in a counterclockwise direction toward the pivotal axis of its associated arm, and cam locking and releasing means, one of said cam locking means being mounted for substantially continuous engagement with and substantially straight line movement transversely of said first surface of one of said cam means and said second surface of the other of said cam means, and the other of said cam locking means being mounted for substantially continuous engagement with and substantially straight line movement transversely of said second surface of said one cam means and the first surface of said other cam means.

References Cited in the file of this patent
UNITED STATES PATENTS

| | | |
|---|---|---|
| 307,859 | La Due | Nov. 11, 1884 |
| 2,212,823 | Bulk | Aug. 27, 1940 |
| 2,581,080 | Cushman | Jan. 1, 1952 |
| 2,585,358 | Weber | Feb. 12, 1952 |

UNITED STATES PATENT OFFICE
CERTIFICATE OF CORRECTION

Patent No. 2,856,790 October 21, 1958

Calhoun Norton

It is hereby certified that error appears in the printed specification of the above numbered patent requiring correction and that the said Letters Patent should read as corrected below.

Column 2, line 59, after "moved" insert -- away --; line 71, for spirng" read -- spring --; column 7, line 3, for "postion" read -- position --; line 58, for "Is should" read -- It should --; column , line 19, for "there" read -- their --; column 10, line 23, for operator" read -- operation --.

Signed and sealed this 24th day of February 1959.

(SEAL)
Attest:

KARL H. AXLINE
Attesting Officer

ROBERT C. WATSON
Commissioner of Patents